United States Patent [19]

Weidel

[11] Patent Number: 4,966,430
[45] Date of Patent: Oct. 30, 1990

[54] SEMICONDUCTOR CIRCUIT

[75] Inventor: Edgar Weidel, Senden, Fed. Rep. of Germany

[73] Assignee: Telefunken Systemtechnik GmbH, Ulm, Fed. Rep. of Germany

[21] Appl. No.: 419,583

[22] Filed: Oct. 10, 1989

[30] Foreign Application Priority Data

Oct. 10, 1988 [DE] Fed. Rep. of Germany ....... 3834335

[51] Int. Cl.⁵ .................................. G02B 6/12
[52] U.S. Cl. ...................... 350/96.11; 350/96.12
[58] Field of Search ..................... 350/96.11, 96.12

[56] References Cited

U.S. PATENT DOCUMENTS

| 4,169,001 | 9/1979 | Kaiser | 156/89 |
| 4,699,449 | 10/1987 | Lam et al. | 350/96.11 |
| 4,758,063 | 7/1988 | Konechny, Jr. | 350/96.20 |
| 4,772,787 | 9/1988 | Trommer | 250/227 |
| 4,871,224 | 10/1989 | Karstensen et al. | 350/96.15 |
| 4,904,036 | 2/1990 | Blonder | 350/96.11 |

FOREIGN PATENT DOCUMENTS

| 59-82779 | 12/1984 | Japan . |
| WO84/00822 | 3/1984 | PCT Int'l Appl. . |
| WO85/03179 | 7/1985 | PCT Int'l Appl. . |
| WO87/05120 | 8/1987 | PCT Int'l Appl. . |

OTHER PUBLICATIONS

Y. Kokubun et al., "Silicon Optical Printed Circuit Board for Three-Dimensional Integrated Optics", Electronics Letters, vol. 21, No. 11, May 23rd, 1985, pp. 508–509.

Primary Examiner—Frank Gonzalez
Attorney, Agent, or Firm—Spencer & Frank

[57] ABSTRACT

An integrated semiconductor circuit arrangement composed of a substrate with an electrical portion, configured, for example, of an integrated circuit in planar CMOS or bipolar technology, an optical connecting layer disposed thereabove which includes at least one integrated (connecting) light waveguide, and an electro-optical and/or opto-electrical transducer disposed in a recess in the substrate, electrically connected to the integrated circuit and optically coupled to the light waveguide.

15 Claims, 1 Drawing Sheet

SEMICONDUCTOR CIRCUIT

REFERENCE TO RELATED APPLICATIONS

This application claims the priority of Federal Republic of Germany application Ser. No. P 38 34 335.5 filed Oct. 10th, 1988, which is incorporated herein by reference.

BACKGROUND OF THE INVENTION

The present invention relates to a semiconductor circuit arrangement of the type including a substrate having at least one integrated circuit disposed at a major surface of the substrate and a plurality of electrical conductor paths disposed on the major surface for providing electrical connections to the integrated circuit.

Integrated semiconductor circuits are composed of a (semiconductor) substrate, e.g. wafer-shaped, monocrystalline silicon, having a thickness of about 0.3 mm. A semiconductor circuit arrangement, composed, for example, of transistors and diodes, is formed on one surface side of the substrate in presently customary semiconductor technology, e.g. in the bipolar or CMOS (complementary metal oxide semiconductor) technology. On this semiconductor circuit arrangement, there is disposed a conductor path layer composed, for example, of aluminum conductor paths. The conductor path layer serves to electrically connect the exemplary mentioned transistors and/or diodes. Such an arrangement is also referred to as an integrated circuit (IC).

Complex circuit arrangements, such as, for example, signal processors or computers, are generally composed of a larger number of such integrated circuits. These integrated circuits are fastened, for example by gluing and/or soldering, to cards composed, for example, of ceramic or a semiconductor material, e.g. silicon. Electrical connections are established between the integrated circuits via electrical conductor paths disposed on the card. In a conventional manner, these cards are then pushed into a housing and are connected with one another via further electrical conductor paths in the rear wall of the housing.

The then required number of electrical connecting lines may be extremely large. For example, a signal processor may contain more than 100 integrated circuits which require many thousands of electrical connecting lines. The clock pulse rates of present-day circuits lie typically at 20 MHz. To produce faster signal processors, clock pulse rates of more than 100 MHz are required. However, with increasing clock pulse rates, the danger of annoying electrical crosstalk arises between parallel or intersecting lines. Thus the probability of a bit error increases.

SUMMARY OF THE INVENTION

It is therefore an object of the invention to provide a semiconductor circuit of the above type which permits a high packing density of electronic components, which permits the attainment of a high data transmission rate between remotely disposed components and/or component groups, which provides for the lowest possible error probability, and which can be produced economically and reliably.

The above object is generally achieved according to the present invention by a semiconductor circuit arrangement of the type including a substrate having at least one integrated circuit disposed at a major surface of the substrate and a plurality of electrical conductor paths disposed on the major surface for providing electrical connections to said integrated circuit; and wherein: a recess is provided in the major surface of the substrate; one of an electro-optical and an opto-electrical transducer is disposed in the recess and extends to the major surface and is electrically connected with the at least one integrated circuit via at least one of the conductor paths; an optical connecting layer containing at least one light waveguide is disposed on the substrate above the plurality of conductor paths; and means are provided for optically coupling the transducer to the at least one light waveguide.

According to a further feature of the invention the substrate is provided with at least one further transducer and integrated circuit which are disposed in a further recess in the major surface of the substrate, and the transducers are coupled together via the light waveguide in the connecting layer. Moreover according to another feature of the invention two such circuit arrangements may be optically coupled together.

A first advantage of the invention is that integrated light waveguides are employed particularly for the connection between electronic component groups. These light waveguides permit a high data transmission rate and can be produced with great precision, for example with the aid of photolithography and/or ion implantation.

A second advantage is that the electrical portion and the optical portion of the semiconductor circuit can be manufactured and tested separately. Thus optimum, and therefore economical and reliable, manufacturing processes can be selected for each portion.

A third advantage is that the electrical portion of the semiconductor circuit requires almost no bonded connections so that this portion can be produced in planar semiconductor technology.

The invention will be described below in greater detail for embodiments thereof with reference to the schematic drawings.

DETAILED DESCRIPTION OF THE PREFERRED EMBODIMENTS

Figure 1:
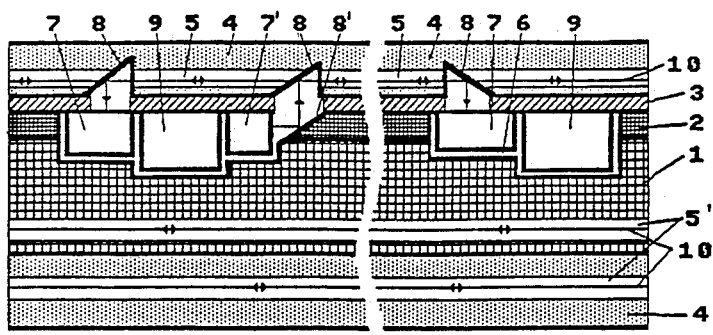
FIG. 1 is a schematic cross-sectional view of one embodiment of a semiconductor circuit according to the invention.

FIG. 1 shows a substrate 1, e.g. a circular monocrystalline silicon wafer as presently customary in the semiconductor art, having a thickness of about 0.3 mm to 0.5 mm and a diameter of about 150 mm. On the upper major surface of this substrate or wafer, there are disposed electrical conductor paths 3 produced in the presently customary planar technology. Conductor paths 3 are contained in a layer composed preferably of two layers of metal striplines separated from one another by dielectric insulating layers disposed between them. According to the present invention at least one recess or indentation 6 is made in the upper major surface of substrate 1, for example by etching, to such a depth that at least one electro-optical and/or opto-electrical transducer 7, 7' and at least one integrated circuit 9 can be disposed therein, for example by gluing or soldering, in such a manner that their respective upper surfaces essentially form a plane with the major surface of the substrate and the lower surface of the layer of conductor paths 3. Then it is possible to electrically connect transducers 7 and 7' and the integrated circuit with the conductor path layer by way of conductor paths 3. In the drawing figures, the numeral 7 identifies an opto-electrical transducer, e.g. a photodiode, and the numeral 7' an electro-optical transducer, e.g. a laser diode.

Further components, for example an electrical multiplexer/demultiplexer and driver circuits for transducers 7 and 7' may be disposed in recess 6. The upper surface of all of these components essentially form a plane and are electrically contacted by way of the layer of conductor paths 3. Above the conductor path layer, there is at least one optical connecting layer 4, e.g. a glass plate having a thickness of about 0.3 mm to 2 mm. At least one light waveguide 5, which is produced preferably in an optically integrated manner, for example with the aid of the presently customary photolithographic methods and a subsequent ion exchange method, is disposed in this connecting layer 4. The core of light waveguide 5, which in this embodiment extends substantially parallel to the major surface of the substrate, has, for example, a square cross sectional area, with side lengths of about 40 μm. However, connecting layer 4 may also be made of plastic in which plastic light waveguides are provided. Additionally included in the connecting layer 4 are non-transparent and/or semi-transparent deflection mirrors 8 with which transducers 7 and 7' can be optically coupled to the light waveguide 5, for example with the aid of further deflection mirrors 8' disposed in substrate 1 in an optical path between the transducer and the light waveguide. All of the deflection mirrors 8 and 8' are produced by physical and/or chemical processes, e.g. by stamping, cutting, grinding, polishing and/or etching of the respective layer containing the deflection mirrors. In the illustrated embodiment of the invention with a semiconductor material substrate 1, the deflection mirrors 8' is a crystallographic surface of the substrate.

Thereafter, deflection mirrors 8 and 8' may also be coated with optically active layers, e.g. semi-transparent or totally reflecting layers. This coating process may be effected, for example, in a vacuum with the aid of an oblique vapor deposition process. Such an optical connecting layer 4 is then fastened on the conductor path layer 3 or a protective layer, e.g. an oxide layer, thereabove, for example by gluing, so that deflection mirrors 8 face the conductor path layer and are disposed above the optical entrance and/or exit openings of transducers 7 and 7'. It is understood that corresponding openings are provided in the conductor path layer. Such an arrangement makes it possible for the light 10 emanating from transducer 7', e.g. a semiconductor laser with such a modulation that a data transmission rate up to about 2 Gbit/s is possible, to be coupled into the light waveguide 5 disposed in connecting layer 4 and can there be transmitted over relatively long distances, e.g. several cm, as shown by the interruption to the transducer 7 shown on the right in FIG. 1. The resulting electrical signals are transmitted by way of electrical conductor paths 3 to an integrated circuit 9, e.g. a demultiplexer, and are then processed further.

Light waveguide 5 may have such dimensions, for example, that it is possible to transmit in opposite directions in optical wavelength multiplex. This is indicated by the double arrows for the light traveling in the waveguide 5. It is also possible, for example, by way of ion implantation, to also produce a further light waveguide 5' in substrate 1 and to transmit light 10 through it. Moreover, at least one further optical connecting layer 4' containing at least one light waveguide 5' may also be provided below substrate 1.

If an electro-optical transducer 7' is employed which transmits light perpendicularly to the surface of substrate 1, deflection mirror 8' may be omitted and the transducer 7' position directly below the associated deflection mirror 8 in a manner similar to that shown for the opto-electric transducer 7.

Moreover, an additional layer-type semiconductor circuit arrangement 2, for example in bipolar technology, may be provided in substrate I at its major surface and connected to the conductor paths 3.

Figure 2:
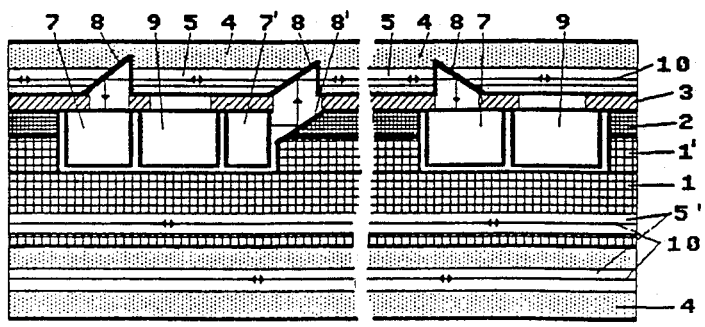
FIG. 2 is a schematic cross-sectional view of a further embodiment of a semiconductor circuit according to the invention.

FIG. 2 shows a further embodiment of the invention in which the substrate is a composite formed of a lower substrate 1, which does not have any recesses but preferably a planar upper surface, and an upper substrate 1' disposed on the upper surface of the lower substrate. The electrical conductor paths 3 are disposed on the upper major surface of the upper substrate 1', which is preferably composed of Si and is fastened to substrate 1, for example by soldering, welding, gluing, bonding or by an anodic bonding. The upper substrate 1' is provided with recesses 6, which in this case are through bores, in which transducers 7 and 7' and integrated circuits 9 are accommodated. The height of the substrate 1', and of the transducers 7 and 7' and the integrated circuits 9 disposed in the recesses 6 of substrate 1' is the same, with permissible deviations of no more than about 20 μm. In contrast to FIG. 1, the electrical conductor paths 3 also do not extend over the entire surface of integrated circuits 9 but only to the contact points in the edge regions.

Combinations of the embodiments of FIGS. 1 and 2 are also possible.

Figure 3:
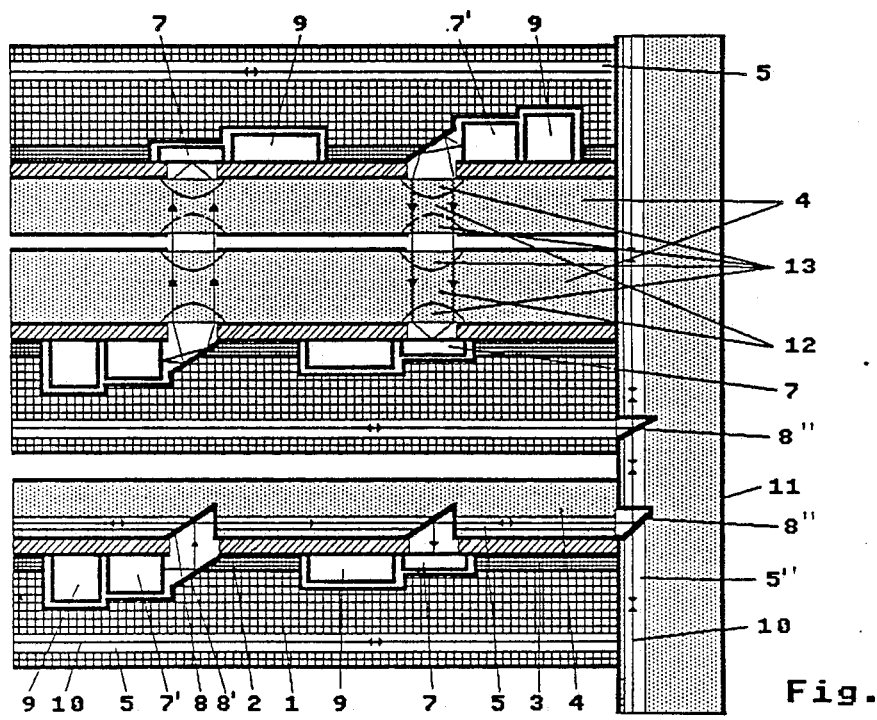
FIG. 3 is a schematic sectional view showing a plurality of semiconductor circuits according to the invention which are optically coupled together.

FIG. 3 shows an embodiment in which several arrangements according to FIG. 1 and/or FIG. 2 can be coupled optically. This is done with the aid of an optical circuit board 11, e.g. also a glass or plastic plate, in which there is disposed at least one light waveguide 5" and non-transparent and/or semi-transparent deflection mirrors 8". Circuit board 11 is arranged essentially perpendicular to several parallel arrangements of FIGS. 1 and 2 in such a manner that the deflection mirrors 8" disposed in circuit board 11 couple the light 10 in light waveguide 5" into light waveguides 5 and/or 5'.

Another additional or alternative possibility for optical couplings between several arrangements according to FIG. 1 is shown in the upper portion of FIG. 3. There, two semiconductor circuit arrangements according to FIG. 1 are disposed adjacent and in parallel such that their respective optical connecting layers 4 face one another. These layers 4 may be spaced from one another, as shown, or may contact one another and/or may be connected, for example, by means of an adhesive. The light (arrows) emanating from a transducer 7' is coupled, for example by way of an optical imaging arrangement 13 included in the connecting layer, into a light path 12, for example another light waveguide, which extends perpendicularly through the two connecting layers 4 and is provided at its other end with an opto-electrical transducer 7, e.g. a photodiode.

It is further possible to place optical arrangement 13 in the edge region of the substrate and thus couple together several arrangements according to FIGS. 1 and 2.

The described arrangements permit, in an advantageous manner, the combination of the advantages of an integrated electrical circuit with those of a integrated optical circuit. In this way, it is possible to produce, for example, very fast high performance computers since, on the one hand, it is possible to give the electrical components a high packing density and, on the other hand, a high data transmission rate becomes possible between different circuit arrangements.

The present invention is not limited to the described embodiments but can also be applied in the same sense in others. For example, the optical connecting layers 4 may contain optical switches and/or optical multiplexers, and/or demultiplexers, and/or may be coupled with them and/or further individual light waveguides, e.g. a very long monomode light waveguide.

The invention now being fully described, it will be apparent to one of ordinary skill in the art that any changes and modifications can be made thereto without departing from the spirit or scope of the invention as set forth herein.

WHAT IS CLAIMED:

1. In a semiconductor circuit arrangement including a substrate having at least one integrated circuit disposed at a major surface of the substrate and a plurality of electrical conductor paths disposed on said major surface for providing electrical connections to said at least one integrated circuit; the improvement comprising: a recess in said major surface of said substrate; said at least one integrated circuit and one of an electro-optical and an opto-electrical transducer disposed in said recess and each extending to said major surface and with said transducer being electrically connected with said at least one integrated circuit via at least one of said conductor paths; an optical connecting layer containing at least one light waveguide disposed on said main surface of said substrate above said plurality of conductor paths; and means for optically coupling said transducer to said at least one light waveguide.

2. A semiconductor circuit arrangement as defined in claim 1 wherein said transducer is an electro-optical transducer; and further comprising: a further recess formed in said major surface of said substrate; a further integrated circuit and an opto-electrical transducer disposed in said further recess and each extending to said major surface, and with said opto-electrical transducer and said further integrated circuit being electrically connected via at least one of said conductor paths; and means for optically coupling said opto-electrical transducer to said at least one light waveguide whereby said transducers are optically coupled together via said at least one light waveguide.

3. A semiconductor circuit arrangement as defined in claim 1 wherein: said substrate is formed of semiconductor material; and a further integrated circuit is formed in said major surface of said substrate and electrically connected to said conductor paths.

4. A semiconductor circuit arrangement as defined in claim 1 further comprising a further optical conducting layer disposed on the opposite major surface of said substrate and having at least one further light waveguide therein.

5. A semiconductor circuit arrangement as defined in claim 1 wherein said at least one light waveguide extends perpendicular to said major surface.

6. A semiconductor circuit arrangement as defined in claim 1 wherein said at least one light waveguide extends parallel to said major surface.

7. A semiconductor circuit arrangement as defined in claim 6 wherein said means for optically coupling includes at least one deflection mirror provided in said optical connecting layer in a light path between said light waveguide and said transducer.

8. A semiconductor circuit arrangement as defined in claim 7 wherein said transducer is an electro-optic semiconductor transducer which emits light essentially parallel to said major surface of said substrate; and said coupling means includes a further deflection mirror disposed in a recess in said surface of said substrate and in said light path between said transducer and said light waveguide.

9. A semiconductor circuit arrangement as defined in claim 8 wherein: said substrate is formed of semiconductor material, and said at least one deflection mirror disposed in said substrate is a crystallographic surface of said substrate.

10. A semiconductor circuit arrangement as defined in claim 7 wherein said transducer is an electro-optic semiconductor transducer which emits light essentially perpendicularly to said major surface of said substrate.

11. A semiconductor circuit arrangement as defined in claim 7 wherein: said optical connecting layer is composed of one of glass and plastic; and said deflection mirror disposed in said connecting layer is a surface thereof produced by physical or chemical treatments.

12. A composite semiconductor circuit arrangement including a plurality of semiconductor circuit arrangements as defined in claim 1, with said at least one light waveguide in said connecting layers of said plurality of semiconductor circuit arrangements extending parallel to the respective said major surfaces; an optical circuit board including at least one light waveguide disposed perpendicular to said major surfaces of said plurality of semiconductor circuit arrangements adjacent an end thereof; and means for optically coupling said light waveguide of said optical circuit board to the respective said light waveguides of said plurality of semiconductor circuit arrangements to optically couple together at least two of said semiconductor circuit arrangements.

13. A composite semiconductor circuit arrangement as defined in claim 12 wherein said optical circuit board is composed of one of glass, plastic, a semiconductor material and a combination of these materials.

14. A composite semiconductor circuit arrangement including: two of semiconductor circuit arrangements as defined in claim 1 with said at least one light waveguide in said optical connecting layer of each of said two semiconductor circuit arrangements extending perpendicular to the respective said major surface, said two semiconductor circuit arrangements being disposed with their respective said optical connecting layers adjacent one another and with the respective said light waveguides aligned; and said means for optically coupling includes an optical imaging arrangement disposed in the resulting light path.

15. A composite semiconductor circuit arrangement as defined in claim 14 wherein said optical imaging arrangement is configured as an integrated optical arrangement formed in said connecting layer.

* * * * *